(12) United States Patent
Satoh et al.

(10) Patent No.: US 6,462,110 B2
(45) Date of Patent: Oct. 8, 2002

(54) CONCRETE ADMIXTURE

(75) Inventors: Haruyuki Satoh; Haruya Mino; Tatsuo Izumi; Keishi Shimokawa, all of Wakayama (JP)

(73) Assignee: Kao Corporation, Tokyo (JP)

( * ) Notice: Subject to any disclaimer, the term of this patent is extended or adjusted under 35 U.S.C. 154(b) by 81 days.

(21) Appl. No.: 09/737,966

(22) Filed: Dec. 18, 2000

(65) Prior Publication Data

US 2001/0012864 A1 Aug. 9, 2001

(30) Foreign Application Priority Data

Dec. 20, 1999 (JP) ............................ 11-361108

(51) Int. Cl.$^7$ ..................... C04B 24/26; C08F 220/28
(52) U.S. Cl. ................... 524/5; 526/318.2; 526/318.41
(58) Field of Search ......................... 524/5, 2

(56) References Cited

U.S. PATENT DOCUMENTS

| 3,380,972 | A |   | 4/1968  | Le Blanc et al. |         |
|-----------|---|---|---------|-----------------|---------|
| 6,166,112 | A | * | 12/2000 | Hirata          | 524/5   |
| 6,187,841 | B1| * | 12/2001 | Tanaka          | 524/5   |

FOREIGN PATENT DOCUMENTS

| DE | 19653524 A | 6/1998  |
| EP | 0056627 A  | 10/1993 |
| EP | 0983976    | 3/2000  |
| JP | 5918338    | 4/1984  |
| JP | 6131333    | 2/1986  |
| JP | 0524894    | 2/1993  |
| JP | 7118047    | 5/1995  |
| JP | 0812396    | 1/1996  |
| JP | 0859323    | 3/1996  |
| JP | 0940446    | 2/1997  |

\* cited by examiner

Primary Examiner—Christopher Henderson
(74) Attorney, Agent, or Firm—Birch, Stewart, Kolasch & Birch, LLP

(57) ABSTRACT

The present invention provides a concrete admixture which is useful in the field of a highly strong concrete, which has a high flowability and which is excellent in an applicability of a concrete paste. That is, the present invention provides a concrete admixture comprising a copolymer-mixture obtained by copolymerizing a specific monomer (A) such as an ethylene-based unsaturated carboxylic acid-derivative having a polyoxyalkylene group and a specific monomer (B) such as a (meth)acrylic acid with changing the molar ratio of (A)/(B) at least one time in the polymerization course, as well as a concrete composition comprising the said concrete admixture.

7 Claims, 1 Drawing Sheet

CONCRETE ADMIXTURE

TECHNICAL FIELD

The present invention relates to a concrete admixture.

PRIOR ART

A highly strong concrete is promoted to be used in order to correspond with a multistoried building or a large construction in recent years. For these, a concrete admixture is required to have a flowability in an application of a concrete paste as well as to have an ability of highly reducing water from the concrete paste and another ability to reduce a viscosity of the concrete paste being sent under a pumping pressure.

There was a high water-reducing agent for a highly strong concrete such as a condensate of naphthalenesulfonic acid with formalin (i.e. a naphthalene-based compound) and a condensate of melaminesulfonic acid with formalin (i.e. a melamine-based compound), up to now. In addition, there is recently known a water-soluble vinyl-copolymer (e.g. a polycarboxylic acid-based compound) exhibiting an excellent dispersibility (slump value) such as a copolymer of polyalkylene glycol monoester-based monomers with (meth)acrylic and/or dicarboxylic acid-based monomers. However, although the dispersibility is improved by the water-reducing agent among them, the flowability of the concrete paste is poor after being send under the pumping pressure so that the applicability of the concrete paste is unsatisfactory.

JP-A 59-18338 or JP-A 8-12396 discloses a prior method for producing a polycarboxylic acid-based copolymer. That is, monomers are uniformly added in the prior method. However a mixture of the obtainable copolymers is unsatisfactory in the dispersibility and flowability. Although JP-A 8-59323, JP-A 7-118047, JP-A 5-24894 or JP-A 61-31333 provides another polycarboxylic acid-based copolymer, the ratios of monomers are not changed at admixing the monomers in its producing method. Accordingly the copolymer is unsatisfactory in the dispersibility and flowability. Further, for example, JP-A 9-40446 corresponding to EP-A 983976 provides a concrete admixture comprising two copolymers being different from each other in the ratios of monomers, but a mixture of the copolymers is also unsatisfactory in the dispersibility and flowability.

DISCLOSURE OF INVENTION

The object of the present invention is to provide a concrete admixture which is particularly useful in the field of highly strong concretes, which has a high dispersibility and flowability and which is excellent in an applicability of concrete.

The present inventors have found that a mixture of copolymers obtained by reacting specific monomers preferably in a specific molar ratio is effective for solving the problem described above. As the result of their further examination on the basis of this finding, they have found that there is particularly effective, among mixtures of such copolymers, a mixture of copolymers obtained by changing a molar ratio of (raw) monomers in the copolymerization course or there is particularly effective another mixture of at least three copolymers obtained by respectively copolymerizing mixtures in molar ratios being different from each other. Thus, the present invention was thereby completed.

That is, the present invention relates to a concrete admixture comprising a copolymer-mixture obtained by copolymerizing at least one monomer (A) represented by the following formula (a) and at least one monomer (B) represented by the following formula (b), changing a molar ratio of the monomer (A) to the monomer (B), namely (A)/(B), at least one time in the polymerization course [,which is referred to as the concrete admixture (I) hereinafter]:

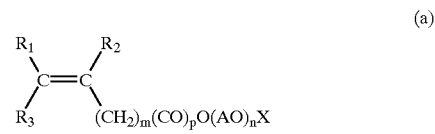

(a)

wherein
each of $R_1$ and $R_2$ represents a hydrogen atom or a methyl group,
m is a number selected from zero to 2,
$R_3$ represents a hydrogen atom or $-COO(AO)nX$,
p is zero or 1
AO represents an oxyalkylene group having 2 to 4 carbon atoms or an oxystyrene group and preferably an oxyalkylene group having 2 or 3 carbon atoms,
n is a number selected from 2 to 300, and
X represents a hydrogen atom or an alkyl group having 1 to 18 carbon atoms and preferably a hydrogen atom or an alkyl group having 1 to 3 carbon atoms; and

(b)

wherein
each of $R_4$, $R_5$ and $R_6$ represents a hydrogen atom, a methyl group or $(CH_2)m1COOM_2$, in which $(CH_2)m1COOM_2$ may be cooperated with $COOM_1$ or another $(CH_2)m1COOM_2$ to produce an anhydride, in this case, $M_1$ and $M_2$ in these groups are not present,
each of $M_1$ and $M_2$ represents a hydrogen atom, an alkali metal, an alkaline earth metal, an ammonium group, an alkylammonium group or a substituted alkylammonium group, and
m1 is a number selected from zero to 2.

Further, the present invention relates to a concrete admixture comprising a copolymer-mixture of at least three copolymers obtained by copolymerizing at least one monomer (A) represented by the formula (a) and at least one monomer (B) represented by the formula (b), changing a molar ratio of (A) or (B) respectively at another molar ratio of (A) to (B), namely (A)/(B), in the range of 0.02 to 4, provided that the formulae (a) and (b) being defined above [,which is referred to as the concrete admixture (II) hereinafter].

Further, the present invention relates to a concrete composition comprising at least one of the concrete admixtures (I) and (II) described above in the present invention.

The present invention also provides a concrete composition comprising aggregates, cement, the concrete admixture as defined above and water; use of the copolymer-mixture as defined above as a concrete admixture; a method of dispersing aggregates, cement and water with the copolymer-mixture as defined above; a process for producing a copolymer-mixture, comprising copolymerizing at least one monomer (A) represented by the formula (a) and at least one monomer (B) represented by the formula (b), changing the molar ratio of (A) to (B), namely (A)/(B), at least one time in the copolymerization course, provided that the formulae (a) and (b) being defined above; the above mentioned process wherein the molar ratio of (A) to (B), namely (A)/(B), is changed at least two times; use of the copolymer-mixture as obtained by the process shown above as a concrete admixture; and a method of dispersing aggregates, cement and water with the copolymer-mixture as obtained by the process shown above.

MODES FOR CARRYING OUT THE INVENTION

Monomer (A)

Figure 1:
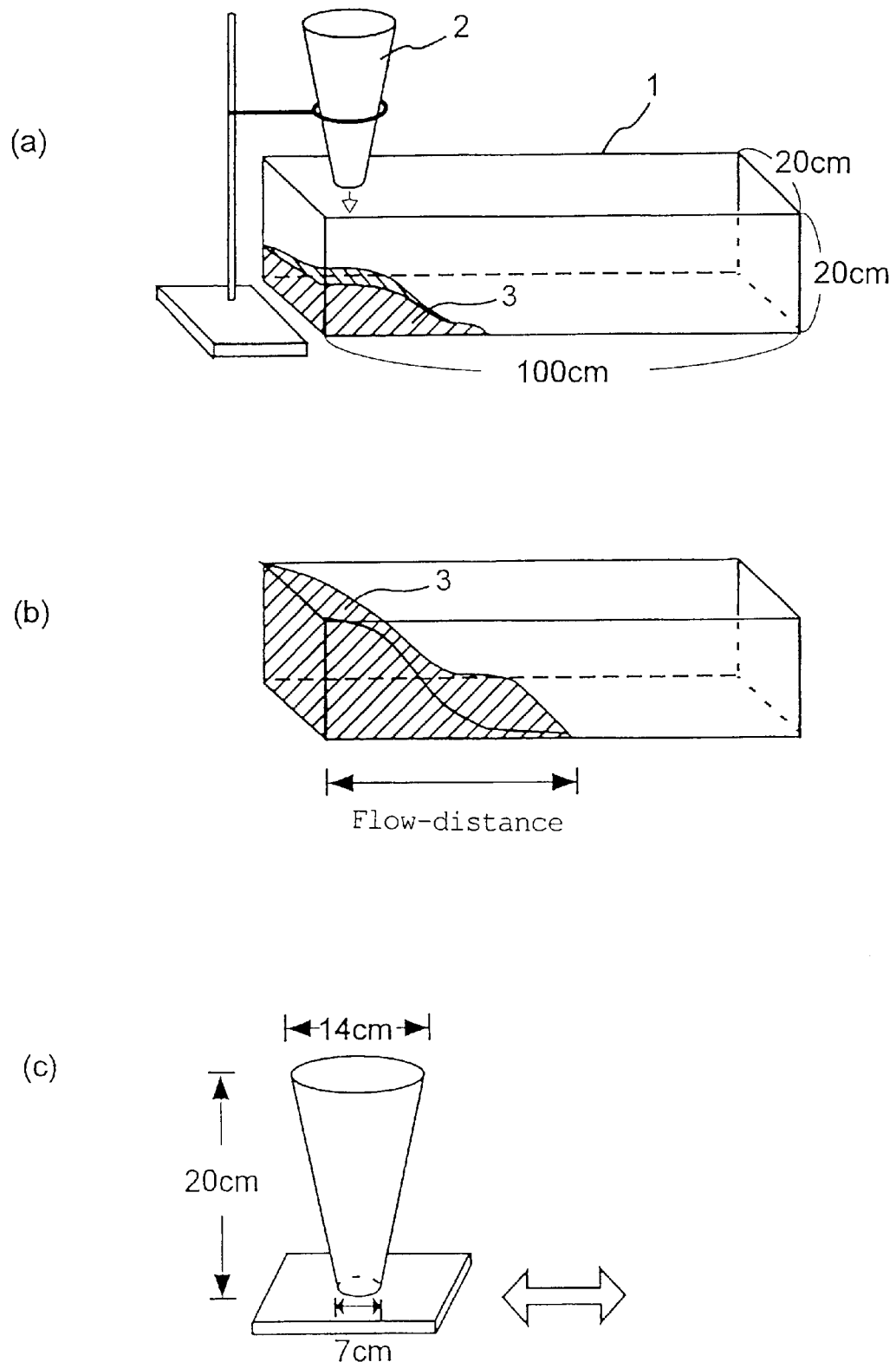
FIG. 1 shows an outline of the method for measuring a flow-distance in Examples, wherein Reference Letter 1 is a box, 2 is a funnel and 3 is a concrete composition.

As the monomer (A) represented by the formula (a), there is preferably used a (half)esterified product of a polyalkylene glycol being partially terminated by an alkyl group such as methoxypolyethylene glycol, methoxypolypropylene glycol, methoxypolybutylene glycol, methoxypolystyrene glycol and ethoxypolyethylene polypropylene glycol with (meth) acrylic acid or maleic acid; an etherified product thereof with (meth)allyl alcohol; or an adduct with ethylene oxide or propylene oxide to (meth) acrylic acid, maleic acid or (meth) allyl alcohol, wherein $R_3$ is preferably a hydrogen atom, p is preferably 1 and m is preferably zero. An esterified product of an alkoxy-, particularly methoxy-, polyethylene glycol with (meth)acrylic acid is more preferable. The average number of added moles of polyalkylene glycol is preferably in the range of 2 to 300 because of an excellent fluidity and fluidity-retention, more preferably 2 to 150 and most preferably 5 to 130.

It is preferable that, from the viewpoint of obtaining a higher dispersibility and flowability, the monomer (A) comprises a monomer (A-1) represented by the following formula (a-1) in combination with a monomer (A-2) represented by the following formula (a-2). Thus, they are used as the monomer (A):

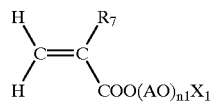

(a-1)

wherein $R_7$ represents a hydrogen atom or a methyl group,

AO represents an oxyalkylene group having 2 to 4 carbon atoms or an oxystyrene group, preferably an oxyalkylene group having 2 or 3 carbon atoms, n1 is a number selected from 12 to 300, and $X_1$ represents a hydrogen atom or an alkyl group having 1 to 18 carbon atoms, preferably a hydrogen atom or an alkyl group having 1 to 3 carbon atoms; and

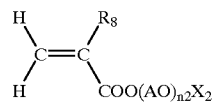

(a-2)

wherein $R_8$ represents a hydrogen atom or a methyl group,

AO represents an oxyalkylene group having 2 to 4 carbon atoms or an oxystyrene group, preferably an oxyalkylene group having 2 or 3 carbon atoms, n2 is a number selected from 2 to 290 provided that the relation between the formula (a-1) and n1 therein is as follows: n1>n2, while (n1−n2)≧10, preferably ≧30 and more preferably ≧50, and $X_2$ represents a hydrogen atom or an alkyl group having 1 to 18 carbon atoms, preferably a hydrogen atom or an alkyl group having 1 to 3 carbon atoms.

Monomer (B)

The monomer (B) represented by the formula (b) is preferably a monocarboxylic acid-based monomer such as (meth)acrylic acid and crotonic acid, a dicarboxylic acid-based monomer such as maleic acid, itaconic acid and fumaric acid, or an anhydride or salt thereof, for example an alkali metal salt, an alkaline earth metal salt, an ammonium salt, a mono-, di- or tri-alkyl (having 2 to 8 carbon atoms) ammonium salt which may be substituted by a hydroxyl group; more preferably (meth) acrylic acid, maleic acid ormaleic anhydride; and most preferably (meth)acrylic acid or an alkali salt thereof.

Concrete Admixture (I)

The concrete admixture (I) of the present invention contains a copolymer-mixture obtained by copolymerizing the above-mentioned monomers (A) and (B) preferably at a molar ratio of (A)/(B) of from 0.02 to 4, wherein the molar ratio of (A)/(B) is changed at least one time in the copolymerization course. The change of the said molar ratio may be any of an increase, a decrease and a combination thereof. When the said molar ratio is changed stepwise or intermittently, the number of changes is preferably from 1 to 10 and particularly from 1 to 5. When the said molar ratio is changed continuously, the change may be any of a linear change, an exponential change and a rest change, provided that the rate of the change per minute is preferably from 0.0001 to 0.2, more preferably from 0.0005 to 0.1 and particularly preferably from 0.001 to 0.05. It is preferable that the molar ratio of (A)/(B) is 0.02 to 4 at least one of before and after the change and it is particularly preferable that the molar ratio of (A) /(B) is 0.02 to 4 at both of before and after the change. The mode of the change of the molar ratio may varies as described above but, in any of these cases, the maximum value of the molar ratio of (A)/(B) and the minimum thereof are different from each other by at least 0.05, preferably at least 0.05 and particularly preferably 0.05 to 2.5.

The copolymer-mixture is obtained by a producing method which includes a polymerizing step wherein the molar ratio (A)/(B) is changed at least one time. Specifically, there may be exemplified a method in which an aqueous solution of the monomer (A) is initiated to be added dropwise as soon as the monomer (B) and these monomers are added dropwise for a predetermined time because their respective flow-rates (parts by weight/minute) for adding dropwise are changed so that their respective molar ratios are within the predetermined range. In this method, the change of the molar ratio of (A)/(B) (,that is, the difference between the maximum value and minimum value thereof) is preferably 0.05 to 2.5 and more preferably 0.1 to 2. As shown in this method, the copolymer-mixture obtained by changing the molar ratio even only one time in the copolymerization is estimated to be a mixture of a large number of copolymers having a broader distribution of the molar ratio of (A)/(B) than that of copolymers obtained by copolymerizing at a constant molar ratio of (A)/(B).

When the above-mentioned monomers (A-1) and (A-2) are used as the monomer (A), the average ratio of (A-1)/(A-2) by weight is preferably 0.1 to 8, more preferably 0.2 to 2.5 and particularly preferably 0.4 to 2. This average ratio by weight is an average value of ratios by weight of the total monomers used in the copolymerization. The molar ratio for copolymerization of the monomers (A-1) and (A-2) to the monomer (B), that is (A-1)+(A-2) /(B), is selected such that the said molar ratio is preferably 0.02 to 4, more preferably 0.05 to 2.5 and particularly preferably 0.1 to 2 at least one of before and after a change, and that the said molar ratio is particularly preferably in these ranges at both of before and after the change.

As mentioned above, it is preferable that the flow-rate for adding dropwise of 30% or more and particularly 50 to 100% by weight of the total monomers is changed to produce the copolymer-mixture.

In the method described above, the change of the molar ratio or the ratio by weight may be regulated by changing the flow-rate for adding dropwise all or a part of the monomers to be added. Further, the change of the flow-rate for adding dropwise may be carried out continuously or stepwise or it may be carried out continuously in combination with stepwise. The change may be not only one-dimensional change of either increase or decrease but also alternate changes of increase and decrease. Each of the monomers to be added may be added individually. Or, two or more mixed solutions containing the monomers in a different compositional ratio may be previously prepared and then added one after another. When the monomers are added dropwise individually, it is preferable that a monomer is added dropwise in the largest amount with a constant flow-rate while other monomers are added dropwise with changed flow-rates to attain the desired monomer composition. Alternatively, it is thinkable that a part of the monomers to be added is charged into a vessel (or chamber) being acceptant for the monomers and then, while the remaining monomers are added with a continuously or stepwise changed rates to the vessel, the resultant mixed solution containing the monomers is added to a reaction-vessel from the vessel being acceptant for the monomers. Further, it is possible that a part of monomers to be added is charged into a reactor and then the remaining monomers are added dropwise with continuously or stepwise changed flow-rates to the reactor in order to be polymerized.

In the method described above, the degree of change of the molar ratio or the ratio by weight is controlled with measuring the flow-rate of fed monomers by a flow meter, a level gage or the like. At this case, the degree of change is specifically determined with depending on the basis of a kind or charged amount (rate) of the monomers. In general, there is shown the following tendency: when the content of the monomer (A) is increased, the flowability is improved; when the content of the monomer (B) is increased, the dispersibility is improved; and when n in the formula (a) for the monomer (A) is small, the dispersibility-retention of is lowered because the setting rate is slow; when n is large, the dispersibility-retention is raised because the setting rate is rapid. Thus, it is more than enough to determine the molar ratio or the ratio by weight at the polymerization with depending on the desired performance.

The polymerization reaction may be carried out in the presence of a solvent. The solvent maybe water; a lower alcohol such as methanol, ethanol, isopropanol and butanol; an aromatic hydrocarbon such as benzene, toluene and xylene; an alicyclic hydrocarbon such as cyclohexane; an aliphatic hydrocarbon such as n-hexane; an ester such as ethyl acetate; or a ketone such as acetone and methyl ethyl ketone. Among them, water or a lower alcohol is preferable in view of easy handing and solubility of the monomer or polymer.

In the copolymerization reaction, a polymerization initiator can be added. The polymerization initiator may be an organic peroxide, an inorganic peroxide, a nitrile-based compound, an azo-based compound, a diazo-based compound or a sulfinic acid-based compound. The added amount of the polymerization initiator is preferably 0.05 to 50% by mole (or mole-%) as compared with the total of the monomers of formulae (I) and (II) and other monomers Adding dropwise of the polymerization initiator is preferably started along with dropping of the monomers. The flow-rate for adding dropwise may be variable or constant. Therefore, it is more than enough to establish the flow-rate so as to obtain the desired molecular weight and reaction rate.

In the copolymerization reaction, a chain transfer agent can be added. The chain transfer agent may be a lower alkyl mercaptan, a lower mercapto-fatty acid, thioglycerol, thiomalic acid or 2-mercaptoethanol. In particular, when water is used as the solvent, the chain transfer agent(s) is added to be able to regulate the molecular weight more stably. The chain transfer agent can be mixed with the monomers or added dropwise individually along with the monomers at once. The flow-rate for adding dropwise may be variable or constant. Therefore, it is more than enough to regulate the flow-rate in order to obtain the desired molecular weight. The temperature for the copolymerization reaction is preferably from zero to 120° C.

The polycarboxylic acid-based polymer thus obtained can be treated for deodorization as necessary. In particular, when a thiol such as mercaptoethanol is used as the chain transfer agent, an unpleasant odor readily remains in the polymer, thus deodorizing treatment is desirably carried out.

The polycarboxylic acid-based polymer obtained in the producing method described above with an acid form, as it is, can be applied as a dispersant for cement. But it is preferably converted into a salt form by neutralization with an alkali from the viewpoint of inhibiting an ester's hydrolysis caused by acidity. This alkali may be a hydroxide of an alkali metal or alkaline earth metal, ammonia, a mono-, di- or tri-alkyl (having 2 to 8 carbon atoms) amine, or a mono-, di- or tri-alkanol (having 2 to 8 carbon atoms) amine. When a (meth)acrylic acid-based polymer is used as a dispersant for cement, the polymer is preferably neutralized partially or completely.

The weight average molecular weight [in terms of polyethylene glycol as determined by a gel permeation chromatography, column: G 4000 PWXL+G 2500 PWXL (provided by Tosoh Corp.), eluent: a 0.2 M phosphate buffer/acetonitrile=7/3 (by volume)] of the polycarboxylic acid-based polymer obtained by the method described above is preferably from 10,000 to 200,000 and more preferably from 20,000 to 100,000 in order to obtain a sufficient dispersibility as a dispersant for cement.

To obtain the concrete admixture (I) of the present invention by the method described above, the average ratio of the monomer (A) to the monomer (B), namely (A)/(B), by weight used ranges preferably between 30/70 and 99/1, more preferably between 60/40 and 98/2 and most preferably between 80/20 and 97/3 in the total monomers. When the monomers (A-1) and (A-2) are used as the monomer (A), the average ratio by weight of the monomer (A-1) to the monomer (A-2), namely (A-1)/(A-2), in the total monomers used is preferably from 10/90 to 90/10 and more preferably from 20/80 to 80/20.

Further, a copolymerizable monomer such as acrylonitrile, (meth)acrylamide, styrene, (meth)acrylic acid alkylester (having 1 to 12 carbon atoms and optionally having hydroxyl group) and styrenesulfonic acid may be used in combination. The monomer can be used in a ratio of 50% or less and particularly 30% or less in the total monomers. But, zero percent by weight is preferable.

The concrete admixture (I) of the present invention can be obtained by the method for producing a concrete admixture, which comprises copolymerizing at least one monomer (A) represented by the above-mentioned formula (a) and at least one monomer (B) represented by the above-mentioned formula (b) at the molar ratio of the monomer (A) to the monomer (B) as shown above, namely (A)/(B), changing at least one time in the copolymerization course.

Concrete Admixture (II)

The concrete admixture (II) of the present invention comprises a copolymer-mixture of at least three copolymers, preferably 3 to 10 copolymers and more preferably 4 to 8 copolymers, obtained by copolymerizing at least one monomer (A) represented by the formula (a) and at least one monomer (B) represented by the formula (b), changing a molar ratio of (A) or (B) respectively at another molar ratio of (A)/(B) in the range of 0.02 to 4, provided that the formulae (a) and (b) being defined above. The said copolymer-mixture is obtained by mixing at least three copolymers which have separately been copolymerized from each other. The change of the molar ratio as shown above is preferably at least 0.05, more preferably at least 0.1 and particularly preferably at least 0.2. The method for obtaining each of the copolymers is in accordance with the reaction method for the concrete admixture (I) described above, but the molar ratio of (A)/(B) is not changed in the copolymerization.

Concrete Composition

The concrete composition of the present invention comprises at least one of the above-mentioned concrete admixtures (I) and (II) of the present invention, as well as cement, fine aggregates and coarse aggregates. Further, there may be comprised a various additive agent (or matter) such as a high water-reducing agent, an AE agent, a retarder, a defoaming agent, a foaming agent, a waterproofing agent and a preservative. A publicly known one of them in the art is used. Further, a fine powder of a blast furnace slag, a fly ash, a silica fume, a stone-powder or the like may be blended. The concrete composition of the present invention comprises the concrete admixture (I) or (II), preferably in an amount of 0.01 to 5.0% by weight (in terms of solid content), particularly 0.05 to 2.0% by weight as compared with cement. Use of the concrete composition may be a foamed (light) concrete, a heavy concrete, a waterproof concrete, mortar or the like but is not limited to them.

The concrete admixture (I) or (II) of the present invention can be used to obtain a concrete composition exhibiting a flow-distance of 50 cm or more and preferably 70 cm or more under the condition of 19 cm slump. The method for measuring the flow-distance is as follows.

Method for Measuring the Flow-distance

① Slump

In accordance with JIS A 1101.

② Concrete composition (Materials)

Cement (C): a Portland cement (with 3.16 of specific gravity) provided by Taiheiyo Cement Corp.

Fine aggregate (S): a pit sand (with 2.61 of specific gravity) from Kimitsu in Chiba Prefecture.

Coarse aggregate (G): crush stones of lime (with 2.72 of specific gravity) from Mt. Torigata in Kochi Prefecture.

(W) Tap water.

The blending ratio is as follows: W/C=40%, s/a [as the ratio of sand/(sand+gravel) by volume]=45.8%, C=425 kg/m$^3$, W=170 kg/m$^3$, S=778 kg/m$^3$, G=960 kg/m$^3$.

(Preparative method)

The materials described above and the admixture were kneaded in a forced twin-screw mixing type mixer for 90 seconds. The added amount of the admixture was regulated so as to adjust the above-described slump value in the range of 18 to 20 cm.

③ Flow-distance (measurement of flowability)

As shown in FIG. 1 (a), 500 ml of a concrete composition 3 were charged in a funnel 2 made of stainless steel with its lower end closed with a plate at 20 cm in height. Then, 500 ml of the concrete composition 3 every 10 seconds were dropped to a box 1 with 100 cm in length, 20 cm in height and 20 cm in width made of vinyl chloride. When the concrete composition 3 rises to the top of the box 1, the distance thereof flowed in the longer direction was measured [as FIG. 1(*b*)] and regarded as the flow-distance. As shown in FIG. 1(*c*), the funnel 2 is cone-shaped with an upper opening of 14 cm in diameter and a lower opening of 7 cm in diameter and with a distance from the upper to lower opening being 20 cm. When the said funnel 2 is viewed along the plane, the funnel 2 is arranged so that the funnel 2 is in a center of the short side of the box 1 (at 10 cm from the end thereof) and that the edge of the upper opening is apart by 3 cm from the said short side. The lower opening of the funnel 2 is arranged at the height corresponding to the top of the box. The flow-distance was measured twice under the conditions of 18 to 19 cm and 19 to 20 cm slump, and the distance flowed at 19 cm slump was calculated.

EXAMPLES

Examples 1 to 7 and Comparative Examples 1 to 3

In the present examples, the monomers (A) and (B) were added individually while the flow-rate of only one of them to be added was changed stepwise.

[i] Monomers

The monomers (A), (B) and (C) shown in Table 1 were used as seen in Table 2 to produce a concrete admixture in the following manner.

[ii] Production of the concrete admixture 321 parts by weight of water was charged into a reaction-vessel made of glass and heated to 78° C. under an atmosphere of nitrogen. Then, a mixed solution comprising 581 parts by weight of a 60% aqueous solution of the monomer (A-IV) and 2.5 parts by weight of a 75% aqueous solution of phosphoric acid was added dropwise thereto at a constant flow-rate for 90 minutes. As soon as the said mixed solution was initiated to be added dropwise, 14 parts by weight of the monomer (B–I), 20 parts by weight of a 15% aqueous solution of ammonium persulfate and 2.4 parts by weight of 2-mercaptoethanol were initiated to be added dropwise. Further, they were added dropwise for 90 minutes with changing the molar ratio of (A)/(B) every interval for adding dropwise as shown in Table 2.

Further, the resultant mixture was aged at the same temperature for 60 minutes. 7 parts by weight of a 15% aqueous solution of ammonium persulfate were added dropwise thereto for 5 minutes and then aged for 120 minutes. Then, 8 parts by weight of a 48% aqueous solution of sodium hydroxide were added thereto to obtain a concrete admixture (as Example 1). The concrete admixtures as Examples 2 to 7 and Comparative Examples 1 to 3 in Table 2 were produced in the same manner except that the concentration of each of the charged components in an aqueous solution was changed as necessary. The monomer C-1 in Example 6 was added at a constant rate of 1.30 parts by weight/minute for 90 minutes.

Example 8

In the present example, two mixtures comprising the monomers (A) and (B) were prepared and added one after another.

412 parts by weight of water were charged into a reaction-vessel made of glass and heated to 78° C. under an atmosphere of nitrogen. Next, a mixed solution comprising 178 parts by weight of a 60% aqueous solution of the monomer (A-IV) shown in Table 1, 89 parts by weight of a 84% aqueous solution of the monomer (A–I) in shown Table 1, 12.9 parts by weight of the monomer (B–I) in shown Table 1, 0.6 part by weight of a 75% aqueous solution of phosphoric acid and 0.8 part by weight of 2-mercaptoethanol was added dropwise thereto for 45 minutes along with 5 parts by weight of a 15% aqueous solution of ammonium persulfate. Then, a mixed solution comprising 178 parts by weight of a 60% aqueous solution of the monomer (A-IV) shown in Table 1, 83 parts by weight of a 84% aqueous solution of the monomer (A–I) shown in Table 1, 18.1 parts by weight of the monomer (B–I) shown in Table 1, 0.6 part by weight of a 75% aqueous solution of phosphoric acid and 0.9 part by weight of 2-mercaptoethanol was added dropwise thereto for 45 minutes along with 6 parts by weight of a 15% aqueous solution of ammonium persulfate. The changes in the molar ratio of (A)/(B) and in the weight ratio of (A-1)/(A-2) every interval for adding dropwise are shown in Table 2. After adding dropwise, the resultant mixture was aged at 78° C. for 60 minutes and then 5 parts by weight of a 15% aqueous solution of ammonium persulfate was added dropwise thereto for 5 minutes. Further, the mixture was further aged at 79° C. for 120 minutes and 13 parts by weight of a 48% aqueous solution of sodium hydroxide was added thereto whereby a concrete admixture was obtained.

TABLE 1

| Monomer (A) | A-I | Methacrylate of an adduct to methanol with EO (EOp 9) |
| | A-II | Methacrylate of an adduct to methanol with EO (EOp 23) |
| | A-III | Methacrylate of an adduct to methanol with EO and PO (EOp 75, Pop 10, at random) |
| | A-IV | Methacrylate of an adduct to methanol with EO (EOp 115) |
| | A-V | Methacrylate of an adduct to methanol with EO (EOp 153) |
| | A-VI | Methacrylate of an adduct to methanol with EO (EOp 390) |
| | B-I | Methacrylic acid |
| Monomer (B) | B-II | Acrylic acid |
| Other components | C-I | 2-Hydroxyethyl acrylate |

EOp is the average number of added moles of ethylene oxide.
POp is the average number of added moles of propylene oxide.

TABLE 2

| | Monomer | | | | Time for adding | Ratio of | | |
| | (A) | | | Other | dropwise | Molar ratio of | (A-1)/(A-2) by | Ratio of (A)/(B) |
| | (A-1) | (A-2) | (B) | component | (minute) | (A)/(B) | weight | by weight |
| Examples | | | | | | | | |
| 1 | A-IV | — | B-I | — | 0~10 | 0.33 | — | 96.2/3.8 |
| | | | | | 10~70 | 0.43 | — | |
| | | | | | 70~90 | 0.54 | — | |
| 2 | A-I | — | B-I | — | 0~30 | 0.54 | — | 81.2/18.8 |
| | | | | | 30~75 | 0.89 | — | |
| | | | | | 75~90 | 1.08 | — | |
| 3 | A-II | — | B-II | — | 0~45 | 1.00 | — | 90.3/9.7 |
| | | | | | 45~90 | 0.43 | — | |
| 4 | A-V | A-II | B-I | — | 0~35 | 0.98 | 0.36 | 96.2/3.8 |
| | | | | | 35~70 | 0.80 | 0.37 | |
| | | | | | 70~90 | 0.71 | 0.37 | |
| 5 | A-III | — | B-II | — | 0~45 | 1.00 | — | 96.5/3.5 |
| | | | | | 45~90 | 0.33 | — | |
| 6 | A-IV | — | B-I | C-I | 0~45 | 0.54 | — | 94.1/5.9 |
| | | | | | 45~90 | 0.18 | — | |
| 7 | A-IV | A-I | B-I | — | 0~55 | 0.36 | 1.91 | 86.1/13.9 |
| | | | | | 55~75 | 0.60 | 1.63 | |
| | | | | | 75~90 | 0.83 | 1.51 | |
| 8 | A-IV | A-I | B-I | — | 0~45 | 1.14 | 1.43 | 92.0/8.0 |
| | | | | | 45~90 | 0.77 | 1.54 | |

TABLE 2-continued

| | Monomer | | | Time for adding | Ratio of | | |
|---|---|---|---|---|---|---|---|
| | (A) | | Other | dropwise | Molar ratio of | (A-1)/(A-2) by | Ratio of (A)/(B) |
| | (A-1) | (A-2) | (B) | component | (minute) | (A)/(B) | weight | by weight |

| | (A-1) | (A-2) | (B) | component | (minute) | (A)/(B) | (A-1)/(A-2) by weight | Ratio of (A)/(B) by weight |
|---|---|---|---|---|---|---|---|---|
| Comparative Examples | | | | | | | | |
| 1 | A-IV | A-I | B-I | — | 0~90 | 0.45 (constant) | 1.77 | 86.1/13.9 |
| 2 | A-VI | — | B-I | — | 0~30 | 0.33 | — | 98.1/1.1 |
| | | | | | 30~60 | 0.43 | — | |
| | | | | | 60~90 | 0.67 | — | |
| 3 | A-IV | — | B-I | — | 0~90 | 2.33 (constant) | — | 99.3/0.7 |

\* The ratio of (A)/(B) by weight is the average ratio by weight of the total monomers to be finally reacted (and that holds true in the followings, hereinafter).

Examples 9 to 10

In the present examples, the rate for adding dropwise the monomer (A-1) was constant while the rate for adding dropwise the other monomers were continuously changed.

[i] Monomers

The monomers shown in Table 3 were used as seen in Table 3 to produce concrete admixtures in the following manner.

[ii] Production of the concrete admixtures 329 parts by weight of water were charged into a reaction-vessel made of glass and heated to 78° C. under an atmosphere of nitrogen. Next, a mixed solution comprising 601 parts by weight of a 60% aqueous solution of the monomer (A–I) and 2.6 parts by weight of a 75% aqueous solution of phosphoric acid was added dropwise thereto at a constant flow-rate for 90 minutes. As soon as the said mixed solution was initiated to be added dropwise, 7.6 parts by weight of the monomer (B–I), 14 parts by weight of a 15% aqueous solution of ammonium persulfate and 2 parts by weight of 2-mercaptoethanol were initiated to be added dropwise. At this time, the aqueous solution of the monomer (A–I) was added dropwise at a constant rate of 3.8 parts by weight/minute while that of the monomer (B–I) was added dropwise for 90 minutes with changing a rate for adding dropwise from 0.39 part by weight/minute to 1.13 parts by weight/minute in proportion by 0.0082 part by weight/minute.

Further, the resultant mixture was aged at the same temperature for 60 minutes and 7 parts by weight of a 15% aqueous solution of ammonium persulfate were added dropwise for 5 minutes and then aged for 120 minutes. Then, 6 parts by weight of a 48% aqueous solution of sodium hydroxide were added thereto to obtain the concrete admixture in Example 9. The concrete admixture in Example 10 in Table 3 was produced in the same manner except that the concentration of each of the charged components in an aqueous solution was changed as necessary.

TABLE 3

| | Monomer (A) | | | | | Monomer (B) | | | | |
|---|---|---|---|---|---|---|---|---|---|---|
| | (A-1) | | (A-2) | | | | | | | |
| | | | | Rate for adding dropwise (part by weight/minute) | | | | Rate for adding dropwise (part by weight/minute) | | |
| Examples | Kind | Rate for adding dropwise (part by weight/minute) | kind | Range of change | Ratio | Ratio of (A-1)/(A-2) by weight | kind | Range of change | Ratio | Molar ratio of (A)/(B) | Ratio of (A)/(B) by weight |
| 9 | A-I | 3.8 (constant) | — | — | — | — | B-I | 0.39~1.13 | 0.0082 | 1.44~0.565 | 82.1/17.9 |
| 10 | A-IV | 3.7 (constant) | A-I | 1.9~1.7 | 0.0022 | 1.43~1.54 | B-I | 0.25~0.40 | 0.0017 | 1.138~0.765 | 92.1/7.9 |

Comparative Example 4

A copolymer was synthesized according to Reference Example 5 in JP-B 2-7901. 395.5 parts by weight of water were charged into a reaction-vessel made of glass and heated to 95° C. under an atmosphere of nitrogen. Next, an aqueous monomer-solution comprising 140 parts by weight of methoxypolyethylene glycol monomethacrylate (with the average number of added moles of EO being 50), 60 parts by weight of sodium methacrylate and 200 parts by weight of water as well as 3.0 parts by weight of a 5% aqueous solution of ammonium persulfate were added respectively for 2 hours. After the addition, 1.5 parts by weight of a 5% aqueous solution of ammoniumpersulfate were further added thereto for 1 hour. Thereafter, the resultant solution was kept at 95° C. throughout 1 hour to complete the polymerization reaction. Thus, an aqueous solution of a copolymer having an average molecular weight of 230,000 was obtained. The viscosity of the obtained copolymer in a concentration of 5% was 110 mPa.s at 25° C. The said aqueous solution was used as a concrete admixture.

Comparative Example 5

As a concrete admixture, a polycarboxylic acid-based copolymer (FC 600 S, provided by Nippon Shokubai Co., Ltd.) was used.

Evaluation of Performance

The concrete admixtures obtained in Examples 1 to 10 and Comparative Examples 1 to 5 were measured for the flow-distance by the method described above. The results are shown in Table 4.

TABLE 4

| | Added amount (% by weight) | Flow-distance (cm) |
|---|---|---|
| Example | | |
| 1 | 0.22 | 78 |
| 2 | 0.20 | 80 |
| 3 | 0.22 | 70 |
| 4 | 0.32 | More than 100 |
| 5 | 0.26 | 65 |
| 6 | 0.20 | 67 |
| 7 | 0.18 | 88 |
| 8 | 0.28 | More than 100 |
| 9 | 0.26 | 85 |
| 10 | 0.24 | 95 |

TABLE 4-continued

| | Added amount (% by weight) | Flow-distance (cm) |
|---|---|---|
| Comparative Examples | | |
| 1 | 0.20 | 36 |
| 2 | 0.70 | 35 |
| 3 | 0.80 | 43 |
| 4 | 0.26 | 40 |
| 5 | 0.20 | 41 |

* The added amount is the ratio of the copolymer in the cement admixture to the solid content of cement (and that holds true in the followings, hereinafter).

Example 11

The monomers shown in Table 1 were used as seen in Table 5 to produce concrete admixtures in the same manner as in Example 1. Then, the concrete admixtures were examined for the flow-distance by the method described above. The results are shown in Table 5. In Table 5, the concrete admixture Nos. 11-1 to 11-5 are conventional concrete admixtures produced by polymerizing at a constant molar ratio of (A)/(B). The concrete admixture No. 11-6 is a mixture of equal amounts of Nos. 11-1 to 11-5. The concrete admixture No. 11-7 was produced by polymerizing the monomers in the same average ratios by weight as in No. 11-6. The concrete admixture No. 11-8 was produced by polymerizing the monomers in the same average ratios by weight as in No. 11-7 with, however, changing the ratios by weight at predetermined intervals during adding dropwise. As the results, it is recognized that a mixture of at least three copolymers being different from each other in the molar ratio is more excellent in a performance than a copolymer having a single molar ratio of (A)/(B) and that a copolymer-mixture obtained by copolymerizing the monomers with changing the molar ratio at least one time in the copolymerization course is most excellent in a performance than the copolymer.

TABLE 5

| Concrete admixture No. | Monomer (A) | | (B) | Time for adding dropwise (minute) | Molar ratio of (A)/(B) | Ratio of (A-1)/(A-2) by weight | Ratio of (A)/(B) by weight | Added amount (% by weight) | Flow-distance (cm) |
|---|---|---|---|---|---|---|---|---|---|
| | (A-1) | (A-2) | | | | | | | |
| 11-1 | A-IV | A-I | B-I | 0~90 | 0.39 | 1.86 | 84.6/15.4 | 0.14 | 30 |
| 11-2 | A-IV | A-I | B-I | 0~90 | 0.62 | 1.62 | 89.0/11.0 | 0.22 | 40 |
| 11-3 | A-IV | A-I | B-I | 0~90 | 0.77 | 1.54 | 90.7/9.3 | 0.26 | 47 |
| 11-4 | A-IV | A-I | B-I | 0~90 | 0.94 | 1.48 | 92.1/7.9 | 0.38 | 60 |
| 11-5 | A-IV | A-I | B-I | 0~90 | 1.14 | 1.43 | 93.4/6.6 | 0.52 | 75 |
| 11-6 | Mixture of equal amounts of Nos. 11-1 to 11-5 | | | | | | | 0.24 | 95 |
| | A-IV | A-I | B-I | — | 0.70 (average value) | 1.59 (average value) | 90.0/10.0 (average value) | | |
| 11-7 | A-IV | A-I | B-I | 0~90 | 0.70 | 1.59 | 90.0/10.0 | 0.28 | 43 |
| 11-8 | A-IV | A-I | B-I | 0~20 | 0.39 | 1.86 | 90.0/10.0 | 0.22 | More than 100 |
| | | | | 20~65 | 0.77 | 1.54 | | | |
| | | | | 65~90 | 1.14 | 1.43 | | | |

What is claimed is:

1. A concrete admixture comprising a copolymer-mixture obtained by copolymerizing at least one monomer (A) represented by the formula (a) and at least one monomer (B) represented by the formula (b), changing a molar ratio of (A) to (B) at least one time in the copolymerization course:

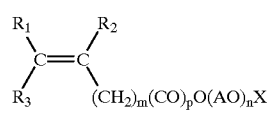
(a)

wherein
- each of $R_1$ and $R_2$ represents a hydrogen atom or a methyl group,
- m is a number selected from zero to 2,
- $R_3$ is a hydrogen atom or —COO (AO) nX,
- p is zero or 1,
- AO represents an oxyalkylene having 2 to 4 carbon atoms or an oxystyrene group,
- n is a number selected from 2 to 300, and
- X represents a hydrogen atom or an alkyl group having 1 to 18 carbon atoms;

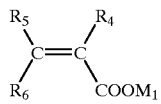
(b)

wherein
- each of $R_4$, $R_5$ and $R_6$ represents a hydrogen atom, a methyl group or —$(CH_2)_{m1}COOM_2$, in which $(CH_2)_{m1}COOM_2$ may be cooperated with $COOM_1$ or another $(CH_2)_{m1}COOM_2$ to produce an anhydride, in this case, $M_1$ and $M_2$ in these groups are not present,
- each of $M_1$ and $M_2$ represents a hydrogen atom, an alkali metal, an alkaline earth metal, an ammonium group, an alkylammonium group or a substituted alkylammonium group, and
- m1 is a number selected from zero to 2;
  - wherein the monomer (A) comprises a monomer (A-1) represented by the formula (a-1) and a monomer (A-2) represented by the formula (a-2):

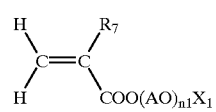
(a-1)

wherein
- $R_7$ represents a hydrogen atom or a methyl group,
- AO represents an oxyalkylene group having 2 to 4 carbon atoms or an oxystyrene group,
- $n_1$ is a number selected from 12 to 300, and
- $X_1$ is a hydrogen or an alkyl having 1 to 18 carbon atoms;

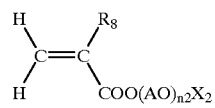
(a-2)

wherein
- $R_8$ represents a hydrogen atom or a methyl group,
- AO represents an oxyalkylene group having 2 to 4 carbon atoms or an oxystyrene group,
- $n_2$ is a number selected from 2 to 290 provided that $n_1 > n_2$ and that $(n_1-n_2) \geq 10$ in relation with n1 of the formula (a-1), and $X_2$ represents a hydrogen atom or an alkyl having 1 to 18 carbon atoms; and
  - wherein an average ratio of the monomer (A-1) to the monomer (A-2) by weight is 0.1 to 8.

2. The admixture as claimed in claim 1, wherein the molar ratio of (A)/(B) is 0.02 to 4 at least one of before and after a change thereof.

3. The admixture as claimed in claim 1, wherein the maximum value of the molar ratio of (A)/(B) and the minimum thereof are different from each other by at least 0.05.

4. The admixture as claimed in claim 1, wherein an average ratio of (A) to (B) by weight ranges between 30/70 and 99/1 in the total monomers.

5. A concrete admixture comprising a copolymer-mixture of at least three copolymers obtained by copolymerizing at least one monomer (A) represented by the formula (a) and at least one monomer (B) represented by the formula (b), changing a molar ratio of (A) or (B) respectively at another molar ratio of (A) to (B) in the range of 0.02 and 4, provided that the formulae (a) and (b) being defined in claim 1.

6. A process for producing a copolymer-mixture as defined in claim 1, comprising copolymerizing at least one monomer (A) represented by the formula (a) and at least one monomer (B) represented by the formula (b), changing the molar ratio of (A) to (B) at least one time in the copolymerization course.

7. The process as claimed in claim 6, wherein the molar ratio of (A) to (B) is changed at least two times.

* * * * *